(12) United States Patent
Bresso et al.

(10) Patent No.: US 11,608,138 B2
(45) Date of Patent: Mar. 21, 2023

(54) SEALING DEVICE IN PARTICULAR FOR SHOCK-ABSORBER STEMS

(71) Applicant: Aktiebolaget SKF, Gothenburg (SE)

(72) Inventors: Marco Bresso, Turin (IT); Massimo Forno, Asti (IT); Paolo Giraudo, Trana (IT); Adriano Valsania, Riva presso Chieri (IT)

(73) Assignee: AKTIEBOLAGET SKF

( * ) Notice: Subject to any disclaimer, the term of this patent is extended or adjusted under 35 U.S.C. 154(b) by 269 days.

(21) Appl. No.: 17/011,040

(22) Filed: Sep. 3, 2020

(65) Prior Publication Data

US 2021/0071732 A1 Mar. 11, 2021

(30) Foreign Application Priority Data

Sep. 11, 2019 (IT) .......................... 102019000016034

(51) Int. Cl.
*F16J 15/3232* (2016.01)
*B62K 25/06* (2006.01)
(Continued)

(52) U.S. Cl.
CPC ................ *B62K 25/06* (2013.01); *F16F 9/36* (2013.01); *F16J 15/3212* (2013.01);
(Continued)

(58) Field of Classification Search
CPC ....... F16F 9/36; B62K 25/06; B60G 2202/24; F16J 15/3232; F16J 15/3252;
(Continued)

(56) References Cited

U.S. PATENT DOCUMENTS 3,970,321 A * 7/1976 Dechavanne ........ F16J 15/3208
277/572
5,269,539 A * 12/1993 Martin ................. F16J 15/3212
277/575
(Continued)

FOREIGN PATENT DOCUMENTS

| EP | 3006762 | 4/2016 |
|---|---|---|
| EP | 3284979 | 2/2018 |
| GB | 2562205 | 11/2018 |

OTHER PUBLICATIONS

Search Report for corresponding Italy application No. 102019000016034 dated May 25, 2020.

*Primary Examiner* — Thomas W Irvin
(74) *Attorney, Agent, or Firm* — Reed Smith LLP

(57) ABSTRACT

Sealing device including a first seal and a second seal each having an annular support formed in the manner of a sleeve and delimited by a first and second face which are situated opposite each other and a first and second annular sealing elements; wherein the first and second annular sealing elements are independent and separate from each other and are fixed integral with a first portion and a second portion of the annular support which are different from each other and are made of a first and second elastomer mix, the second elastomer mix being different from the first mix and having a greater hardness and higher elastic modulus; at least one annular sealing element being provided radially on the inside with at least one annular lip which extends radially and axially in cantilever fashion from a first end of the annular support.

15 Claims, 3 Drawing Sheets

(51) Int. Cl.
  *F16F 9/36* (2006.01)
  *F16J 15/3212* (2016.01)
  *F16J 15/3252* (2016.01)

(52) U.S. Cl.
  CPC ....... *F16J 15/3232* (2013.01); *F16J 15/3252* (2013.01); *B60G 2202/24* (2013.01)

(58) Field of Classification Search
  CPC .. F16J 15/3212; F16J 15/3204; F16J 15/3284; F16J 15/3208
  See application file for complete search history.

(56) References Cited

U.S. PATENT DOCUMENTS

| | | | | |
|---|---|---|---|---|
| 5,649,709 A * | 7/1997 | Munekata | ............ | F16J 15/3232 277/575 |
| 7,828,300 B2 * | 11/2010 | Munekata | ............. | F16J 15/324 277/552 |
| 7,837,017 B2 * | 11/2010 | Imoto | ...................... | F16F 9/36 277/560 |
| 9,581,246 B2 * | 2/2017 | Kubota | .................... | F16J 15/32 |
| 11,105,422 B2 * | 8/2021 | Bresso | .................. | B62K 25/06 |
| 11,131,387 B2 * | 9/2021 | Heldmann | ............ | F16J 15/3244 |
| 2006/0103075 A1 * | 5/2006 | Zahn | ...................... | B62K 25/08 277/436 |
| 2007/0007731 A1 | 1/2007 | Zahn | | |
| 2009/0152779 A1 * | 6/2009 | Imoto | ...................... | F16J 15/56 267/129 |
| 2010/0232734 A1 | 9/2010 | Torii et al. | | |
| 2012/0261888 A1 | 10/2012 | Kelly et al. | | |
| 2013/0001889 A1 * | 1/2013 | Scaramozzino | ...... | F16J 15/3216 277/561 |
| 2014/0167380 A1 * | 6/2014 | Ogura | ...................... | F16F 9/18 280/276 |
| 2014/0216872 A1 * | 8/2014 | Kani | ................... | F16J 15/3232 277/550 |
| 2015/0362075 A1 * | 12/2015 | Kubota | ................. | B62K 21/02 277/569 |
| 2017/0082145 A1 * | 3/2017 | Harada | ............... | F16C 33/7813 |
| 2019/0383395 A1 * | 12/2019 | Bresso | .................. | F16F 9/36 |
| 2022/0128149 A1 * | 4/2022 | Bresso | .................. | B62K 25/06 |

\* cited by examiner

SEALING DEVICE IN PARTICULAR FOR SHOCK-ABSORBER STEMS

CROSS REFERENCE RELATED APPLICATION

This application is based on and claims priority to Italian Application No. 102019000016034, filed Sep. 11, 2019, under 35 U.S.C. § 119 the entire contents of which are incorporated herein by reference.

DESCRIPTION

Field

The present invention relates to a sealing device, in particular designed for installation on shock absorbers of motorcycles or cross-country bicycles and intended to provide a seal between the stem and the shock-absorber body.

Background

In shock absorbers a seal may provide a sealing action both for retaining pressurized oil contained inside a shock-absorber body and for preventing infiltration of external contaminants, e.g., mud, into a mechanical system in which two members move relative to each other, e.g., the shock absorber and the stem, and are subject to a reciprocating sliding movement.

BRIEF DESCRIPTION OF THE DRAWINGS

The invention will now be described with reference to the attached drawings which illustrate a non-limiting example of embodiment thereof, in which.

DETAILED DESCRIPTION

In shock absorbers there exists a problem of providing a sealing action both for retaining pressurized oil contained inside a shock-absorber body and for preventing infiltration of external contaminants, e.g., mud, in a mechanical system in which the two members move relative to each other, e.g., the shock absorber and the stem, are subject to a reciprocating sliding movement.

Such a sealing action may be provided by means of a device comprising one or two annular seals. Such seals include a substantially rigid annular support which is generally made of a stamped metal sheet and an annular sealing element which is made of a single mix and has a first portion intended to exert a static sealing action against a shock-absorber body and a second portion provided with a plurality of annular sealing lips which cooperate by means of sliding friction and interference with a shock-absorber stem.

In cases where a sealing device includes two seals in a tandem arrangement, e.g., in axial sequence along a shock-absorber stem, a first seal is situated axially more outwardly and closes off the shock-absorber body and is provided with one or two lips which function to remove mud, while a second seal is situated axially more inwardly and provides an additional static sealing action against a side wall of a shock-absorber body and is provided with a pair of sealing lips which are arranged in the form of a fork and are both tensioned by a spring, wherein a first lip is directed towards the first seal and is optimized to remove mud and contaminants from a shock-absorber stem and wherein a second lip, which is directed in an opposite direction to the first lip is optimized to provide a seal for oil contained inside a shock absorber body. In an exemplary case of bicycle shock-absorbers there may be a single seal which performs both functions.

However, elastomeric mixes from which sealing elements may be made are the result of a compromise between conflicting needs: while they have satisfactory sealing performance, they generally produce a large amount of friction.

In embodiments, employing the techniques disclosed herein, a sealing ensures an optimum sealing action in respect of both mud and other external contaminants and the oil which is contained inside a shock absorber body and within which the shock-absorber stem is partly immersed, while also producing reduced amounts of friction over sealing devices formed of previously known elastomeric mixes, and is at the same time reliable and inexpensive to produce.

Figure 1:
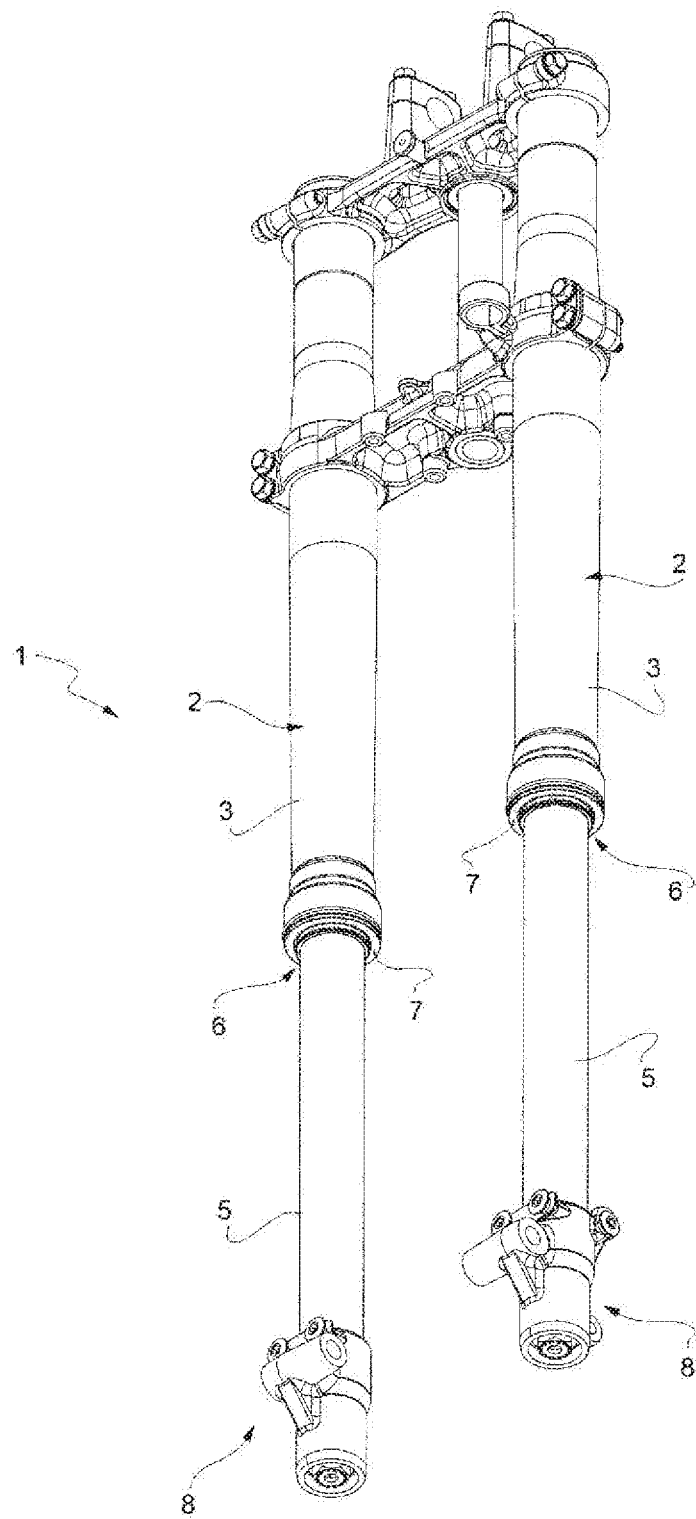
FIG. 1 shows a suspension fork for a motorcycle or cross-country bicycle provided with a pair of shock absorbers in accordance with this disclosure.

FIG. 1 illustrates a typical fork-like suspension 1, e.g., for motorcycles or cross-country bicycles. Said suspension 1 is composed of a pair of shock absorbers 2 that are fixed rigidly together alongside each other.

Figure 2:
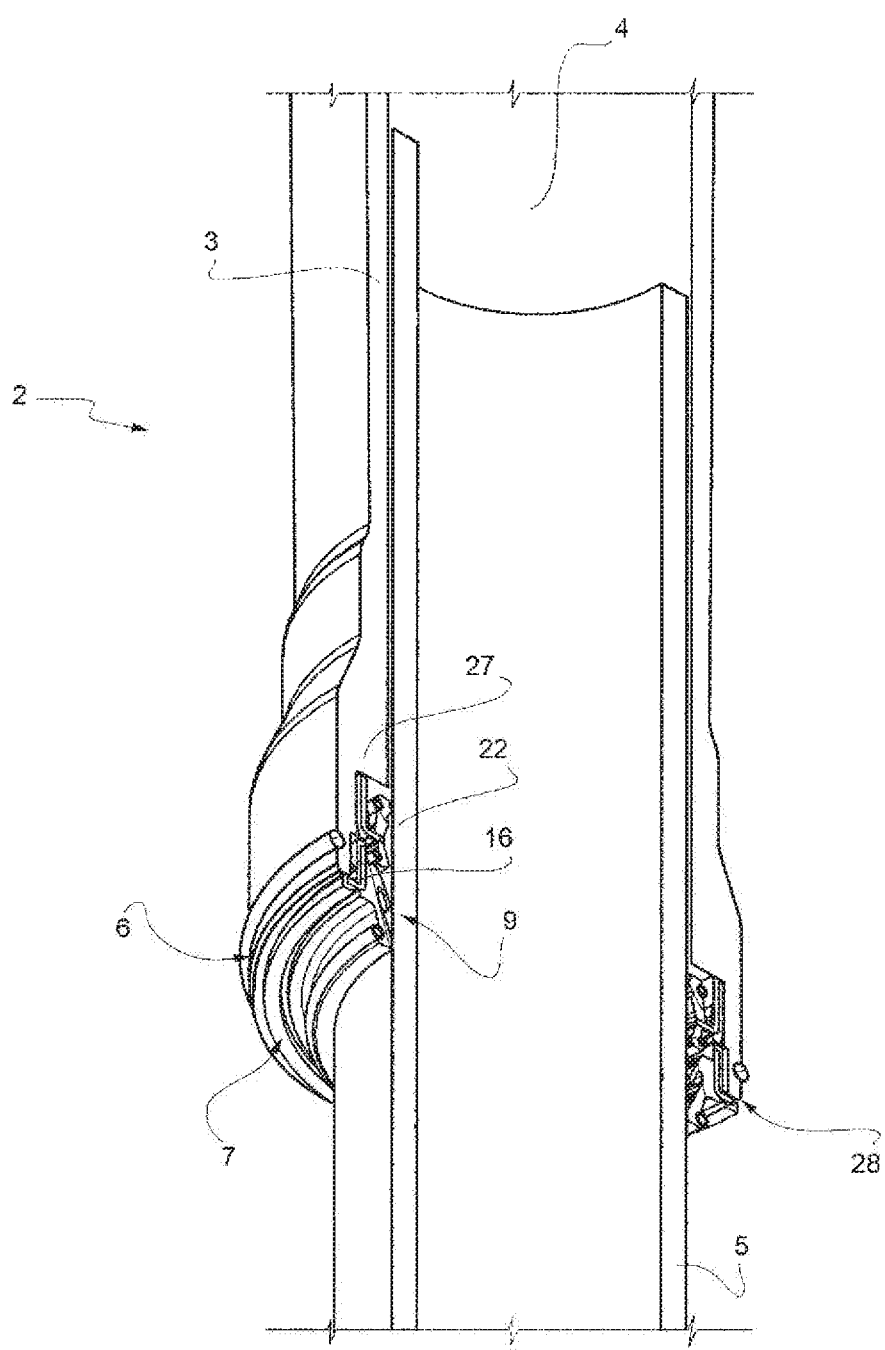
FIG. 2 shows a perspective cutaway view of a shock absorber with a sealing device in accordance with this disclosure.

Each shock absorber 2 (FIG. 2), which may also be used on its own in various applications other than for vehicles, comprises a substantially cylindrical shock-absorber body 3, which is filled with a viscous fluid 4, and a shock-absorber stem 5 mounted telescopically inside the shock-absorber body 3 and is axially slidable therein, being partially immersed in the viscous fluid 4 (FIG. 2).

A shock-absorber stem 5 projects in cantilever fashion from a first open end 6 of shock-absorber body 3. Shock absorber 2 also comprises a sealing device 7 in accordance with this disclosure which is mounted in shock-absorber body 3 so as to close the first open end 6, and through which the shock-absorber stem 5 passes in a fluid-tight manner.

In embodiments, a vehicle wheel, which is known and not shown for the sake of simpler illustration, is fixed during use in a known manner to a free end 8 of the shock-absorber stem 5 of each shock absorber 2.

Figure 3:
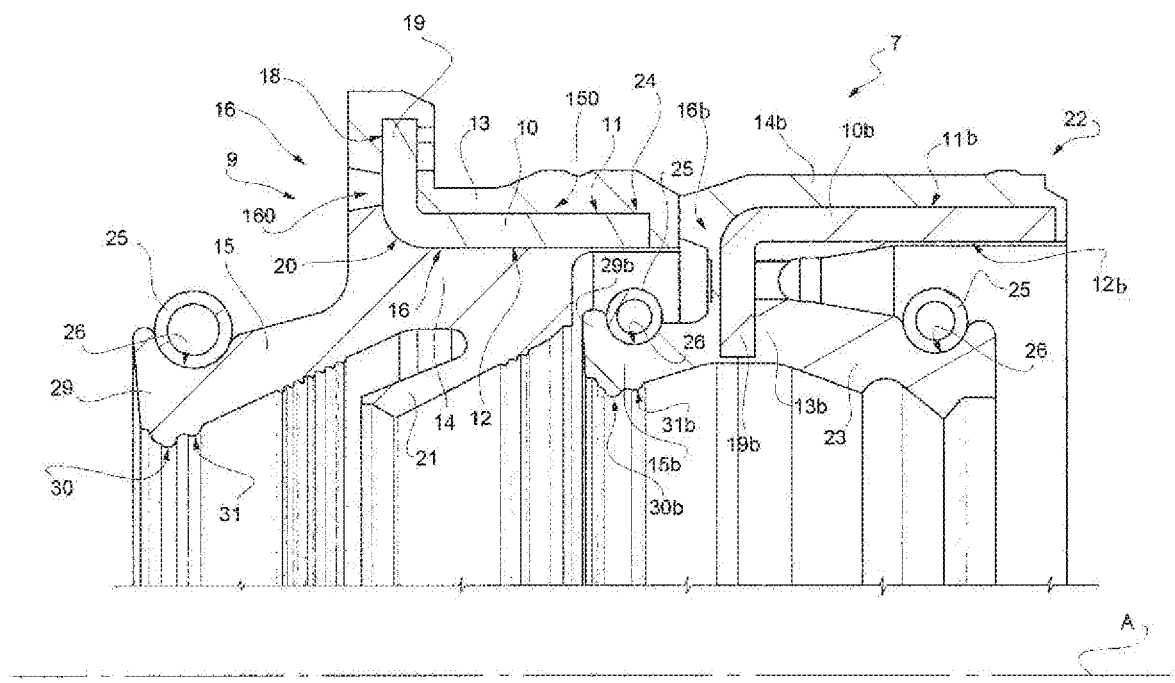
FIG. 3 shows a radially cross-sectioned view of a sealing device in accordance with this disclosure.

Sealing device 7 is shown in detail and on a larger scale, in a schematic manner, in FIG. 3 and more generally can be inserted between any two mechanical members 3 and 5, which mechanical members 3 and 5 are movable relative to each other. In particular mechanical members 3 and 5 are made to perform a reciprocating rectilinear relative movement. Here and below reference will be made to the shock-absorber stem 5 and to the shock-absorber body 3, while still remaining general in nature.

The sealing device 7 is annular and has an axis of symmetry A which, during use, is coaxial with shock absorber stem 5 and shock absorber body 3 and along which a reciprocating, rectilinear, relative movement of stem 5 and body 3 occurs. Sealing device 7 is shown in FIG. 3 only partly, since it is symmetrical.

In some embodiments, sealing device 7 comprises at least one first annular seal 9 in turn comprising a substantially rigid, annular, support 10 which is substantially sleeve-shaped and delimited by a first face 11 and by a second face 12 situated opposite each other, a first annular sealing element 13 and a second annular sealing element 14, which are elastically deformable and made of elastomeric materials and which have been co-moulded and glued during vulcanization onto the support 10.

According to a first aspect of the invention, the first and second annular sealing elements 13 and 14 are independent and separate from each other and are fixed integral with a first portion 150 and a second portion, respectively, of the annular support 10 which are different from each other, so that any deformation of the first sealing element 13 does not have any effect on the second sealing element 14, and vice versa.

According to a fundamental aspect of the invention, moreover, the first annular sealing element 13 is made entirely of a first elastomeric mix, while the second annular sealing element 14 is made entirely of a second elastomeric mix which is different from the first mix and has a greater hardness and higher elastic modulus than those of the first elastomeric mix.

The second annular sealing element 14 is moreover again provided, radially on the inside, with at least a first annular lip 15 which is formed as one piece with the sealing element 14 and made of the same second elastomeric mix as sealing element 14 and which extends radially and axially in cantilever fashion from a first end 16 of the annular support 10.

In particular, the first elastomeric mix, which is softer, is chosen from a group of mixes, for example consisting of NBR, having a Shore A hardness, at 1 second, of between 65 and 80 pts and an elastic modulus, at 25% strain, of between 1.0 and 4.7 MPa.

The second elastomeric mix, which is harder, is chosen form a group of mixes, for example again consisting of NBR (but also other materials) having a Shore A hardness, at 1 second, of between 77 and 90 pts and an elastic modulus, at 25% strain, of between 1.5 and 5.0 MPa.

In the example shown, a first annular sealing element 13 of the first seal 9 is configured in a known manner so as to provide a static seal and is formed integral with the first face 11 of the annular support 10, radially on the outside of annular support 10 and, preferably, as far as a radially outer portion 18 of the second face 12 delimiting an edge 19 folded in the manner of an L radially on the outside of the annular support 10 and defining the first end 16 of the annular support 10.

In the example shown, the second annular sealing element 14 is configured so as to form a dynamic sliding seal (in this exemplary embodiment on stem 5) by means of at least first annular lip 15 and is formed integral with the second face 12 of annular support 10, radially on the inside of the annular support 10.

First annular lip 15 extends axially on an outside of the annular support 10, in the opposite direction to the said annular support, from a radially inner portion 20 of the second face 12.

In the first seal 9, the second annular element 14 also comprises a second annular sealing lip 21 formed as one piece with sealing element 14 and with lip 15 and is made of a same second elastomeric mix as the annular lip 15.

Annular sealing lip 21 extends radially and axially in cantilever fashion from annular support 10 so as to be able to flex elastically in the radial direction towards annular support 10, in a manner similar to the lip 15, but, differently from the latter, it is housed radially inside annular support 10.

Annular sealing lip 21 extends in cantilever fashion from a same side as annular sealing lip 15, with respect to which it is arranged in tandem, axially set back, and has an internal diameter greater than that of the lip 15. Both the lips 15 and 21 are also configured so as to have internal diameters which are smaller than an external diameter of the stem 5, so as to be coupled, during use, with stem 5 with interference and therefore is elastically deformed radially outwards by the stem 5.

In this way, both lips 15 and 21 are configured to cooperate by means of sliding contact with stem 5—lip 15 with greater interference and the lip 21 with smaller interference.

In some embodiments, sealing device 7 comprises a second annular seal 22 arranged axially in tandem with annular seal 9.

Annular seal 22 is similar to annular seal 9 and therefore details which are similar to or the same as those already described for seal 9 are indicated by reference numbers which are similar or the same.

Annular seal 22 comprises a substantially rigid annular support 10b delimited by two opposite faces 11b and 12b, a first, radially inner, annular sealing element 13b and a second, radially outer, annular sealing element 14b, which are independent and separate from each other, where sealing element 14b is configured only partly to provide a static seal and instead has an "appendage" 15b, as will be seen, configured to provide a sealing action in respect of contaminants.

Annular sealing element 14b is formed integral with a first face 11b of annular support 10b, radially on the outside of annular support 10b and as far as an edge 19b of annular support 10b folded in the manner of an L radially on the inside and defining a first end 16b of annular support 10b of second seal 22.

Form edge 19b there extends radially and axially in cantilever fashion and axially on the outside of annular support 10b (and in the example shown, towards annular seal 9 and partially inside the latter) a first annular lip 15b which is formed as one piece with annular sealing element 14b and which is configured to provide a sliding dynamic seal, in exemplary embodiments shown on stem 5 or in any case on a member (e.g., 5) movable in a relative manner.

First annular sealing element 13b is instead configured to provide a sliding dynamic seal on stem or movable member 5 by means of a third annular sealing lip 23 formed as one piece with the annular sealing element 13b.

Annular sealing element 13b is also formed, in this case, integral with second face 12b of annular support 10b, radially on the inside of annular support 10b, and third annular lip 23 extends axially inside annular support 10b of second seal 22, in an opposite direction to first annular lip 15b, from the same first end 16 of the annular support 10b, in particular from the radially inner free end of edge 19b folded in the manner of an L.

In this way, lips 15b and 23 form, viewed in radial cross-section, a fork-like configuration and both cooperate, during use, by means of sliding contact and radial interference with movable member or stem 5, on opposite sides, whereby lip 23 directed towards an inside of shock-absorber body 2 and, in particular towards, and in contact with, a viscous fluid 4 is deformed radially elastically outwards.

In cases where sealing device 7 has, according to a variant not shown for the sake of simpler illustration, a single seal 9, the latter will have annular sealing element 13 extending partially along face 11 also at second end 24 of annular support 10 opposite to first end 16 and provided with an annular sealing lip similar to the lip 23, arranged so as to form a fork-like configuration with the lips 15 and 21, similar to that formed between lips 15b and 23.

In all cases, a first annular sealing lip 15 of first seal 9 and lip 15b of second seal 22 and third annular sealing lip 23 of second seal 22 are tensioned by springs 25 arranged radially on an outside of lips 15, 15b and 23. Springs 25 are helical springs which are folded to form a toroidal configuration and are housed inside respective annular seats 26 of the lips 15, 15b and 23 formed radially on the outside thereof.

From the above description it is clear that the first seal 9 and the second seal 22 are configured so as to be coupled radially on an inside of a side wall 27 of a shock-absorber body, e.g., shock-absorber body 3 (FIG. 2), first seal 9 being axially further outwards than second seal 22 and in axial abutment against the second seal 22.

Furthermore, first seal 9 is configured to be coupled in axial abutment with its first end 16 (owing to the edge 19 folded radially outwards and entirely embedded inside the annular sealing element 13 made of the softer mix) against an end edge 28 of a shock-absorber body 3 delimiting open end 6.

First lip 15 of first seal 9 is configured to have a double point of sliding contact with a first one of the mechanical members 3, 5, in the case in question with the member, defined by stem 5, movable with a reciprocating rectilinear motion. For this purpose, first lip 15 is provided, at a free end 29 thereof and radially on the inside, with a first annular relief 30 and a second annular relief 31, which are arranged alongside each other in axial sequence and have a profile which is rounded in radial cross-section.

In some embodiments, first annular relief 30 has a radial height greater than that of second annular relief 31 and is arranged axially further outwards with respect to annular support 10.

Similarly, the annular sealing lip 15b may also be configured so as to have a double point of sliding contact with a member, e.g., defined by the stem 5, movable with a reciprocating rectilinear motion. For this purpose, annular lip 15b is provided, at a free end 29b thereof and radially on the inside, with a first annular relief 30b and a second annular relief 31b which are arranged alongside each other in axial sequence and which have a rounded profile in radial cross-section. Annular relief 30b has a radial height greater than that of the annular relief 31b and being arranged axially further outwards with respect to annular support 10b and already on the inside of the annular seal 9, in this case on the inside of the end 24.

As a result of the arrangement described above, a fork-like seal with lips which are intended for specific functions, such as reducing the friction (in the case of the lip 23) or improving the scraping action (in the case of the lips 15 and 15b) is created, while improving at the same time the ease of assembly of the sealing device.

The annular sealing elements 13, 14 or 13b, 14b 15b which are independent of each other, but fixed to the same support 10, 10b so that a single seal is obtained, and which are made of two mixes, may be optimized owing to the greater freedom during the design stage and each lip/function may be designed individually so as to obtain the maximum performance without influencing other parts of the seal, while still optimizing the sealing conditions.

In accordance with this disclosure a sealing device insertable between a first and second mechanical member performing a relative movement and having the characteristic features described in the attached claims is therefore provided.

All the objects of the invention are therefore achieved.

The invention claimed is:

1. A sealing device comprising:
a first annular seal comprising:
a substantially rigid sleeve-shaped annular support having a first end, a first portion, and a second portion,
a first annular sealing element made of a first elastomeric mix, and
a second annular sealing element made of a second elastomeric mix which is different from the first mix such that the second annular sealing element has a greater hardness and a higher elastic modulus than the first annular sealing element, wherein the first annular sealing element and the second annular sealing element are separate and distinct and are respectively fixed integral with the first portion and the second portion of the substantially rigid sleeve-shaped annular support, further wherein the second annular sealing element includes at least a first annular lip extending radially and axially in cantilever fashion from the first end of the annular support.

2. The sealing device of claim 1, wherein the first elastomeric mix is chosen from a group having a Shore A hardness, at 1 second, of between 65 and 80 pts and an elastic modulus, at 25% strain, of between 1.0 and 4.7 MPa.

3. The sealing device of claim 2, wherein the second elastomeric mix is chosen from the group having a Shore A hardness, at 1 second, of between 77 and 90 pts and an elastic modulus, at 25% strain, of between 1.5 and 5.0 MPa.

4. The sealing device of claim 3, wherein the first annular sealing element is configured to provide a static seal and is formed integral with a first face of the annular support, radially on the outside of the annular support and extending no further than a radially outer portion of a second face which delimits an edge folded to form an L radially on the outside of the annular support and defining a first end thereof; the second annular sealing element being configured to provide a sliding dynamic seal by means of said at least one first annular lip and being formed integral with a second face of the annular support, radially on the inside of the annular support, the at least one first annular lip extending axially on an outside of the annular support, in the opposite direction to the annular support, from a radially inner portion of the second face.

5. The sealing device of claim 1, wherein the second elastomeric mix is chosen from the group having a Shore A hardness, at 1 second, of between 77 and 90 pts and an elastic modulus, at 25% strain, of between 1.5 and 5.0 MPa.

6. The sealing device of claim 1, wherein the first annular sealing element is configured to provide a static seal and is formed integral with a first face of the annular support, radially on the outside of the annular support and extending no further than a radially outer portion of a second face which delimits an edge folded to form an L radially on the outside of the annular support and defining a first end thereof; the second annular sealing element being configured to provide a sliding dynamic seal by means of said at least one first annular lip and being formed integral with a second face of the annular support, radially on the inside of the annular support, the at least one first annular lip extending axially on an outside of the annular support, in the opposite direction to the annular support, from a radially inner portion of the second face.

7. The sealing device of claim 6, wherein the second annular element of the first seal comprises a second annular sealing lip which is made of the same elastomeric mix as that of the first annular lip and which extends radially and axially in cantilever fashion from the annular support, radially on the inside of the latter, on the same side as the first annular sealing lip.

8. The sealing device of claim 7, wherein the second annular element of the first seal comprises a second annular sealing lip which is made of the same elastomeric mix as that of the first annular lip and which extends radially and axially in cantilever fashion from the annular support, radially on the inside of the latter, on the same side as the first annular sealing lip.

9. The sealing device of claim 1, further comprising:
a second annular seal comprising:
a second substantially rigid annular support and a third and fourth annular sealing element wherein the fourth annular sealing element is configured in part to provide a static seal and is formed integral with the first face of the second substantially rigid annular support, radially on the outside of the second substantially rigid annular support and extending up to an edge of the second substantially rigid annular support being folded to form an L radially on the inside and defining a first end of the second substantially rigid annular support of the second annular seal, from which first end of the second substantially rigid annular support there extends radially and axially in cantilever fashion and axially on the outside of the of the second substantially rigid annular support a third annular lip which is configured to provide a sliding dynamic seal; and wherein the third annular sealing element is configured to provide a sliding dynamic seal by means of a fourth annular lip and is formed integral with the second face of the second substantially rigid annular support, radially on the inside of the second substantially rigid annular support, the fourth annular lip extending axially on the inside of the second substantially rigid annular support of the second seal, in the opposite direction to the first annular lip, from the same first end of the annular support.

10. The sealing device of claim 9, characterized in that the first annular lip of the first annular seal and the third annular lip of second annular seal and the fourth annular lip of the second seal are tensioned by springs arranged radially on the outside thereof.

11. The sealing device of claim 10, wherein the first and second annular seals are configured to be coupled radially on the inside of a side wall of a shock-absorber body, the first annular seal being axially further outwards than the second annular seal and in axial abutment against the second annular seal; the first annular seal being configured to be coupled with its said first end in axial abutment against an end edge of the shock-absorber body.

12. The sealing device of claim 9, wherein the first and second annular seals are configured to be coupled radially on the inside of a side wall of a shock-absorber body, the first annular seal being axially further outwards than the second annular seal and in axial abutment against the second annular seal; the first annular seal being configured to be coupled with its said first end in axial abutment against an end edge of the shock-absorber body.

13. The sealing device of claim 1, characterized in that said first annular lip of the first annular seal is configured to have a double point of sliding contact with a first mechanical member, which is movable with a reciprocating rectilinear motion relative to a second mechanical member; said first annular lip being provided, at a free end thereof and radially on the inside, with a first annular relief and a second annular relief, which are respectively arranged alongside each other in axial sequence and each having a rounded profile in radial cross-section; the first annular relief having a radial height greater than that of the second annular relief and being arranged axially further outwards with respect to the annular support.

14. A shock absorber for vehicles, comprising a shock-absorber body which is substantially cylindrical and filled with a viscous fluid, a shock-absorber stem telescopically mounted within the shock-absorber body and axially slidable therein, being partially immersed in the viscous fluid, the shock-absorber stem projecting in cantilever fashion from a first, open, end of the shock-absorber body, and the sealing device according to claim 1, which is mounted in the shock-absorber body so as to close the first end and through which the shock-absorber stem passes in a fluid-tight manner.

15. A sealing device, comprising:
a first annular seal comprising:
a substantially rigid sleeve-shaped annular support having a first end, a first portion, and a second portion;
a first annular sealing element made of a first elastomeric mix, and
a second annular sealing element made of a second elastomeric mix which is different from the first mix such that the second annular sealing element has a greater hardness and a higher elastic modulus than the first annular sealing element, wherein the first annular sealing element and the second annular sealing element are separate and distinct and are respectively fixed integral with the first portion and the second portion of the substantially rigid sleeve-shaped annular support, further wherein the second annular sealing element includes at least a first annular lip extending radially and axially in cantilever fashion from the first end of the annular support; and
a second annular seal comprising:
a second substantially rigid annular support,
a third annular sealing element, and
a fourth annular sealing element, wherein the fourth annular sealing element is configured in part to provide a static seal and is formed integral with the first face of the second substantially rigid annular support, radially on the outside of the second substantially rigid annular support and extending up to an edge of the second substantially rigid annular support being folded to form an L radially on the inside and defining a first end of the second substantially rigid annular support of the second annular seal, from which first end of the second substantially rigid annular support there extends radially and axially in cantilever fashion and axially on the outside of the of the second substantially rigid annular support a third annular lip which is configured to provide a sliding dynamic seal; and wherein the third annular sealing element is configured to provide a sliding dynamic seal by means of a fourth annular lip and is formed integral with the second face of the second substantially rigid annular support, radially on the inside of the second substantially rigid annular support, the fourth annular lip extending axially on the inside of the second substantially rigid annular support of the second seal, in the opposite direction to the first annular lip, from the same first end of the annular support.

\* \* \* \* \*